United States Patent
Larsson et al.

(10) Patent No.: US 8,923,163 B2
(45) Date of Patent: Dec. 30, 2014

(54) FAST OPPORTUNISTIC DISTRIBUTED RESOURCE REALLOCATION FOR ESTABLISHED CONNECTIONS IN A MULTIHOP NETWORK

(71) Applicant: Telefonaktiebolaget LM Ericsson (publ), Stockholm (SE)

(72) Inventors: Peter Larsson, Solna (SE); Niklas Johansson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/886,923

(22) Filed: May 3, 2013

(65) Prior Publication Data

US 2014/0328215 A1    Nov. 6, 2014

Related U.S. Application Data

(63) Continuation of application No. 10/596,586, filed as application No. PCT/SE03/02040 on Dec. 19, 2003, now abandoned.

(51) Int. Cl.
*H04L 12/24* (2006.01)

(52) U.S. Cl.
CPC .................................... *H04L 41/12* (2013.01)
USPC ........ 370/255; 370/230.1; 370/232; 370/233; 370/234; 370/237; 370/238

(58) Field of Classification Search
CPC .... H04L 12/5695; H04L 45/02; H04W 28/06
USPC ........ 370/255, 230.1–234, 237–238; 709/238
See application file for complete search history.

(56) References Cited

U.S. PATENT DOCUMENTS 5,949,760 A    9/1999    Stevens
5,987,011 A    11/1999   Toh
(Continued)

FOREIGN PATENT DOCUMENTS

JP    2000-341323    8/2000

OTHER PUBLICATIONS

Dongkyun K. et al "Power-aware route maintenance protocol for mobile ad hoc networks" In: IEEE Telecommunications, 2003. ITC 2003. $10^{th}$ International Conference on Feb. 23-Mar. 1, 2003, vol. 1, pp. 501-506, INSPEC AN: 7780357 see p. 501 section I-p. 502, section III, abstract.

(Continued)

*Primary Examiner* — Nicholas Jensen
*Assistant Examiner* — Berhanu Belete
(74) *Attorney, Agent, or Firm* — Roger S. Burleigh

(57) ABSTRACT

A multihop network and nodes are described herein that implement a reactive routing protocol that enables resources of the multihop network to be continuously adapted in a distributed/opportunistic manner in response to a topology change within the multihop network so as to optimize the performance of a connection between a source node and a destination node. The types of resources that can be adapted include for example: (1) a route; (2) a channel; and/or (3) physical layer parameters. The different types of topology changes that can occur include: (1) movement of a node; (2) quality variations in a channel between the source node and the destination node; (3) changes in traffic patterns in the multihop network; (4) changes in transmit patterns (e.g., power, beamforming direction) in the multihop network; and (5) changes in resource allocations in the multihop network.

16 Claims, 2 Drawing Sheets

(56) References Cited

U.S. PATENT DOCUMENTS

| | | | |
|---|---|---|---|
| 6,304,556 B1* | 10/2001 | Haas | 370/254 |
| 6,535,498 B1* | 3/2003 | Larsson et al. | 370/338 |
| 7,027,426 B2* | 4/2006 | Billhartz | 370/338 |
| 7,616,961 B2* | 11/2009 | Billhartz | 455/452.2 |
| 7,649,872 B2* | 1/2010 | Naghian et al. | 370/338 |
| 8,139,504 B2* | 3/2012 | Mankins et al. | 370/254 |
| 8,472,401 B2* | 6/2013 | Lim et al. | 370/331 |
| 8,532,060 B2* | 9/2013 | Reumerman et al. | 370/332 |
| 2001/0033556 A1* | 10/2001 | Krishnamurthy et al. | 370/329 |
| 2002/0077138 A1* | 6/2002 | Bark et al. | 455/522 |
| 2003/0204625 A1* | 10/2003 | Cain | 709/243 |
| 2007/0101015 A1* | 5/2007 | Larsson et al. | 709/238 |

OTHER PUBLICATIONS

Roux, N. et al. "Cost adaptive mechanism to provide network diversity for MANET reactive routing protocols" In: IEEE MILCOM 2000. 21$^{st}$ Century Military Communications Conference Proceedings, 2000, Los Angeles, CA, USA, Oct. 22-25, 2000, vol. 1, pp. 287-291, INSPEC AN: 7022900 see whole document.

* cited by examiner

FAST OPPORTUNISTIC DISTRIBUTED RESOURCE REALLOCATION FOR ESTABLISHED CONNECTIONS IN A MULTIHOP NETWORK

CROSS-REFERENCE TO RELATED APPLICATIONS

This application is a continuation of U.S. application Ser. No. 10/596,586, filed Jun. 16, 2006, which was the national stage of International Application PCT/SE2003/002040 filed Dec. 19, 2003, the disclosures of which are incorporated herein by reference.

BACKGROUND OF THE INVENTION

1. Field of the Invention

The present invention relates in general to a multihop network that implements a reactive routing protocol which is used by nodes to continuously adapt resources of the multihop network in response to topology changes in the multihop network so as to optimize the performance of a connection between a source node and a destination node.

2. Description of Related Art

A problem inherent with multihop networks (wireless ad hoc networks) is that they have a topology that changes over time because the nodes are mobile which can lead to a connection breaking between two nodes relaying traffic for a specific connection. There are several other reasons why a topology changes over time in addition to moving nodes. For example, topology changes may occur even without nodes moving such as variations caused by moving objects on which radio waves reflect or changes in the communication media. These topology changes include, for example, channel variations (of own and/or interfering channels), traffic pattern changes, transmit pattern changes and resource allocation changes. To adapt to these topology changes, the multihop networks can employ either a proactive routing protocol or a reactive routing protocol. In multihop networks that employ a proactive routing protocol, the topology changes are typically adapted to by continuously updating the routing paths between the nodes. And, in multihop networks that employ a reactive routing protocol, the routing paths between the nodes are first set up in what is usually denoted the route discovery phase. Once the path setup is complete, the route maintenance phase takes over. This phase is responsible for maintaining paths between active source/destination pairs in the face of topological changes, for example when two nodes on the path towards the destination node have moved apart too far which causes the connection to break then a route repair procedure (part of the route maintenance phase) is invoked as a rescue operation to try and repair the connections between the nodes. If this rescue operation is not successful, then a new route discovery round has to be performed. Examples of reactive routing protocols include AODV (Ad Hoc on Demand Distance Vector) and DSR (Dynamic Source Routing) that were developed within IETFs MANET workgroup are described in the following articles:

C. Perkins, E. M. Royer and S. R. Das, "Ad Hoc On-demand Distance Vector Routing", RFC 3561, July 2003.

D. Johnson and D. Maltz, "Dynamic Source Routing in Ad Hoc Wireless Networks", draft-ietf-manet-dsr-09.txt, April 2003.

The contents of these articles are hereby incorporated by reference herein.

Although these routing protocols generally work well they still have a drawback in which they fail to do enough to optimize the performance of a connection between two nodes. Accordingly, there is a need for a multihop network that implements a new reactive routing protocol which optimizes the performance of a connection between two nodes. This need and other needs are satisfied by the multihop network, node and method of the present invention.

BRIEF DESCRIPTION OF THE INVENTION

The present invention includes a multihop network that implements a reactive routing protocol which enables nodes to continuously adapt network resources in a distributed/opportunistic manner in response to a topology change within the multihop network so as to optimize the performance of a connection between a source node and a destination node. The types of resources that can be adapted include for example: (1) a route; (2) a channel; and/or (3) physical layer parameters. And, the different types of topology changes that can occur include for example: (1) movement of a node; (2) quality variations in a channel between the source node and the destination node; (3) changes in traffic patterns in the multihop network; (4) changes in transmit patterns (e.g., power, beamforming direction) in the multihop network; and (5) changes in resource allocations in the multihop network (100, 400).

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
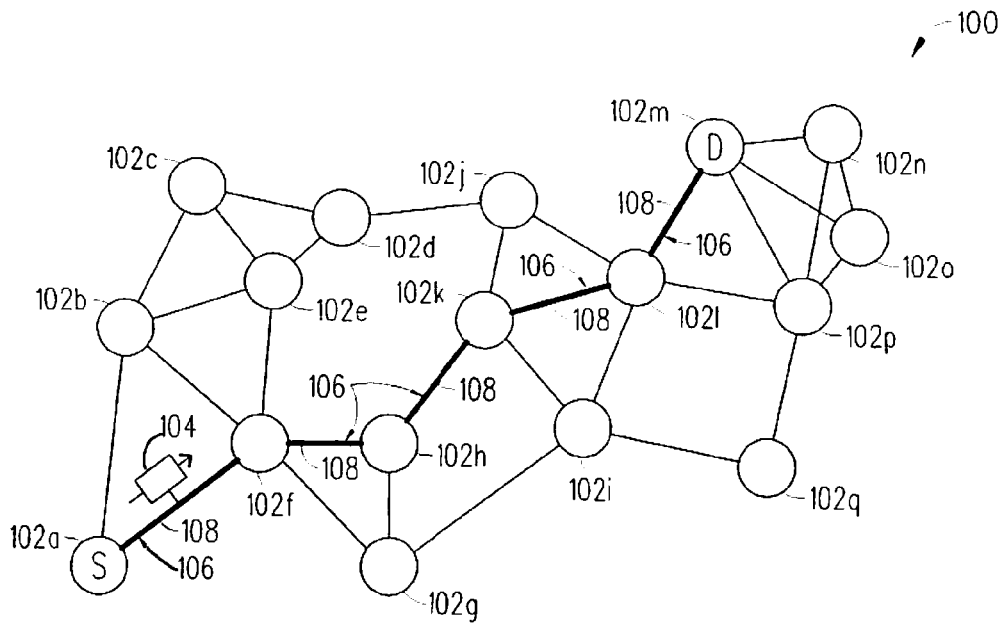
FIG. 1 is a block diagram that illustrates an exemplary multihop network which has nodes that implement a reactive routing protocol in accordance with the present invention.

Referring to FIG. 1, there is disclosed a block diagram of an exemplary multihop network 100 that has nodes 102a, 102b . . . 102q (17 shown) which implement a reactive routing protocol in accordance with method 200 of the present invention. As shown, the multihop network 100 has multiple nodes 102a, 102b . . . 102q that operate in a wireless medium where traffic sent between two nodes 102a and 102m (for example) is called a flow 104 (one shown). The node originating the transfer of data in a flow 104 is called a source node 102a and the node terminating the data is called a destination node 102m. The multihop network 100 can have zero, one or a multitude of flows 104 at each instant between any two nodes 102a, 102b . . . 102q. Each flow 104 is carried in a connection 106 where only one connection 106 between nodes 102a and 102m is shown. It should be appreciated that multiple flows 104 may be multiplexed into a connection 106 and multiple connections 106 may be established for each source node 102a as well as for each destination node 102m. In addition, the same source node 102a and destination node 102m may have multiple connections 106 as well as multiple flows 104. Each connection 106 is defined through a path 108 (route) and is characterized by: (1) the identities of active nodes 102a, 102f, 102h, 102k, 102l and 102m (for example); (2) the channels; and (3) the link parameters along the path 108. In an alternative embodiment of the present invention, the connection 106 is characterized by: (1) the path 108; (2) the link parameters; and (3) the transmit instances. The latter type of connection 106 is associated with non-slotted transmissions in the time domain, whereas the former type of connection 106 is more TDMA (time division multiple access), FDMA (frequency division multiple access) and OFDMA (orthogonal frequency division multiple access) oriented.

As shown, the path 108 is assembled by shorter links between adjacent active nodes 102a, 102f, 102h, 102k, 102l and 102m which form the connection 106. The parameters of a link associated with a transmission of a flow 104 along path 108 are characterized for example by: (1) transmit power; (2) modulation; (3) direction, and (4) MIMO (Multiple-Input-Multiple-Output) parameters. And, the parameters of a link associated with reception of a flow 104 along path 108 may include for example information about the tuning of antenna arrays, provided these parameters are used. Each connection 106 typically has an upper data rate limit and the flow 104 may use a fraction of the available data rate or the full bandwidth. The nodes 102a, 102b . . . 102q within reach of each other are said to be neighbors. There are several definitions of the term "within reach". For example, nodes can be "within reach" of each other whenever one node has an average SNR (signal-to-noise ratio) at reception that exceeds a predetermined level when the maximum permitted transmit power is used at the sending node and no interfering nodes exist. Finally, it should be appreciated that the communications within the multihop network 100 are on separate channels which are typically orthogonal and hence should not interfere with each other. And, the changing from one channel to another in a node 102a, 102b . . . 102q is called channel switching.

In accordance with the present invention, each of the nodes 102a, 102b . . . 102q within the multihop network 100 implement a reactive routing protocol (method 200) that is a marked improvement over the aforementioned traditional reactive routing protocols. Again, the traditional reactive routing protocols like the AODV and DSR have a drawback in which they fail to do enough to optimize the performance of a connection between two nodes. The multihop network 100 of the present invention addresses this need by implementing a new reactive routing protocol (method 200) that adapts one or more resources in the multihop network 100 in response to a topology change in the multihop network 100 in order to optimize the performance of the connection 106 between the source node 102a and the destination node 102m. The types of resources that can be adapted include for example: (1) a route; (2) a channel; and/or (3) physical layer parameters. And, the different types of topology changes that can occur include for example: (1) movement of nodes 102a, 102b . . . 102q; (2) quality variations in a channel between the source node 102a and the destination node 102m (not necessarily only for links currently forwarding data for the connection considered but also for links that may be used instead); (3) changes in traffic patterns in the multihop network 100; (4) changes in transmit patterns (e.g., power, beamforming direction) in the multihop network 100; and (5) changes in resource allocations in the multihop network 100. A more detailed description about the different aspects and features of the reactive routing protocol (method 200) are provided below with respect to FIGS. 2-4.

Figure 2:
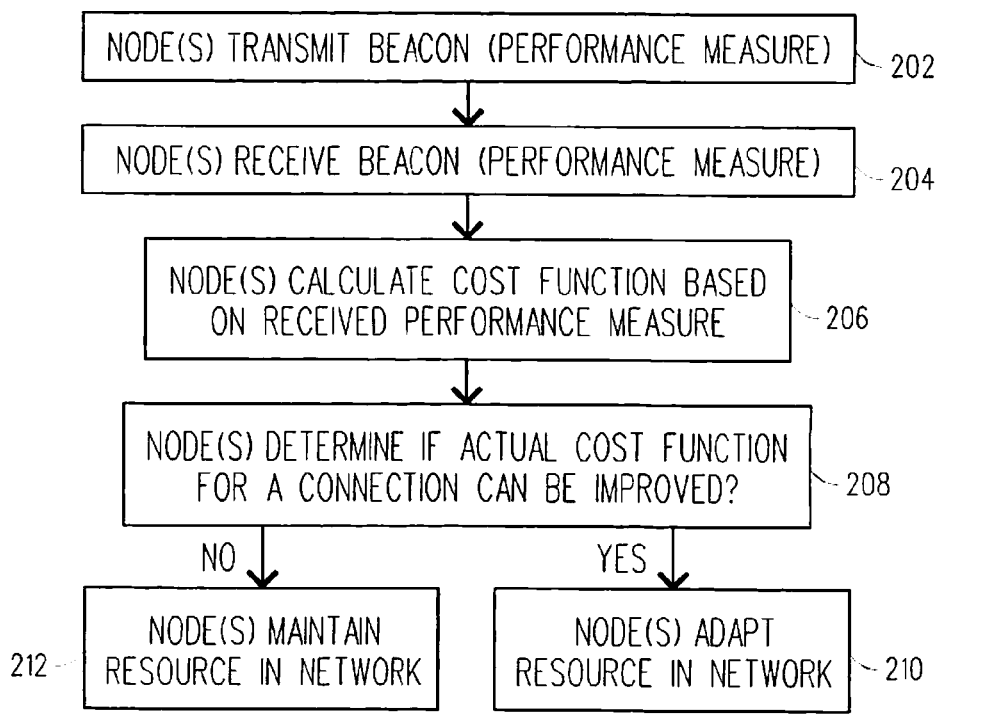
FIG. 2 is a flowchart illustrating the steps of a preferred method for implementing the reactive routing protocol within the multihop network of FIG. 1 in accordance with the present invention.
Figure 3:
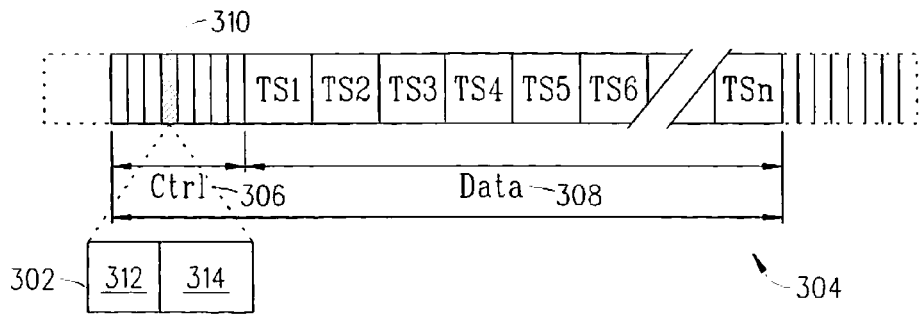
FIG. 3 is a block diagram of an exemplary beacon that can be transmitted from an active node within the multihop network of FIG. 1 in accordance with step 202 of the method of FIG. 2.

Referring to FIG. 2, there is a flowchart illustrating the steps of the preferred method 200 for implementing the reactive routing protocol within the multihop network 100. Beginning at step 202, the active nodes 102a, 102f, 102h, 102i, 102l and 102m (for example) which are located within the connection 106 transmit a beacon 302 (see FIG. 3) that contains one or more measures of performance for the connection 106. In one embodiment, the beacon 302 may be generated once a frame 304 which includes a control part 306 and a TDMA data carrying part 308. The beacon 302 can be assigned a mini timeslot 310 so that it will not collide with beacons 302 (not shown) transmitted from adjacent nodes. The beacon 302 could be transmitted with a power level and data rate that where selected so the beacon 302 has a reach that is as long or longer than other messages sent by nodes 102a, 102f, 102h, 102k, 102l and 102m.

The beacon 302 further includes a general broadcast part 312 and a connection specific part 314. In the general broadcast part 312, the power for the beacon 302 is indicated. This allows any node 102a, 102b . . . 102q that is "within reach" to determine an open loop path loss. The ID of the transmitting node 102a, 102f, 102h, 102i, 102l or 102m (for example) is also indicated. In the connection specific part 314, a connection ID, connection rate, transmit/receive ID and/or transmit power/CIR (Carrier-to-Interference Ratio) can be indicated. In addition, the connection specific part 314 indicates a measure of performance for each connection 106. The measure of performance can be an accumulated cost for the whole connection 106. The maximum allowed power, $P_{max}$, for each timeslot or equivalent connection is another performance measure. $P_{max}$ reflects either a power capability of the transmitting node 102a, 102f, 102h, 102k, 102l or 102m or a maximum power that can be used not to interfere with other ongoing connections 106.

At step 204, the neighboring nodes 102b, 102d, 102e, 102g, 102i, 102j, 102q, 102p and/or 102o (for example) receive one or more of the beacons 302 transmitted from the active nodes 102a, 102f, 102h, 102k, 102l and 102m. The active nodes 102a, 102f, 102h, 102k, 102l or 102m also receive beacons 302 transmitted from other active nodes 102a, 102f, 102h, 102k, 102l or 102m. For example, active node 102f and 102k receive the beacons 302 from active node 102h.

At step 206, each neighboring node 102b, 102d, 102e, 102g, 102i, 102j, 102q, 102p and/or 102o calculates a cost function based on the measure of performance and other information (optional) in each received beacon 302. Likewise, each active node 102a, 102f, 102h, 102k, 102l and/or 102m calculates a cost function based on the measure of performance and other information (optional) in each received beacon 302.

At step 208, each neighboring node 102b, 102d, 102e, 102g, 102i, 102j, 102q, 102p and/or 102o and active nodes 102a, 102f, 102h, 102k, 102l or 102m determines whether the cost function for the connection 106 between the source node 102a and the destination node 102m can be improved by adapting at least one resource (e.g., route, channel and/or physical layer parameters) in the multihop network 100. If the answer at step 208 is yes, then step 210 is performed by the relevant neighboring node 102g (for example) or active node 102f (for example) which adapts at least one resource to improve the cost function for the connection 106 between the source node 102a and the destination node 102m. Typically, the neighboring node 102g (for example) would adapt a route resource as described in greater detail below with respect to FIGS. 4A, 4B and 4D. And, the active node 102f (for example) would adapt a route resource, a channel resource or a physical layer parameter resource as described in greater detail with respect to FIG. 4C. In one embodiment, the relevant neighboring node 102g (for example) or active node 102f (for example) can adapt or reallocate the resource in a distributed manner relatively fast when an average performance measure of a topology change such as an average path loss is used to determine if the cost function of the connection 106 can be improved between the source node 102a and the destination node 102m. In another embodiment, the relevant neighboring node 102g (for example) or active node 102f (for example) can adapt or reallocate the resource in an opportunistic manner when a performance measure of an instantaneous or real-time topology change such as an instant CIR is used to determine if the cost function of the connection 106 can be improved between the source node 102a and the destination node 102m. In either embodiment, the relevant neighboring node 102g (for example) or active node 102f (for example) is allowed to adapt the resource if that adaptation does not adversely affect the performance of another connection in the multihop network 100. If the answer at step 208 is no, then step 212 is performed where the neighboring node 102b, 102d, 102e, 102g, 102i, 102j, 102q, 102p and/or 102o or active node 102a, 102f, 102h, 102k, 102l or 102m simply maintains the resources in the connection 106 between the source node 102a and the destination node 102m.

A more detail description about some of the different ways the method 200 and reactive routing protocol can be used to adapt a route between a source node and a destination node is provided below with respect to FIGS. 4A-4D. To better describe some of the features of the present invention, the multihop network 400 used below has a simpler configuration than the multihop network 100. Of course, it should be noted that the number of nodes shown within the multihop networks 100 and 400 have been selected for simplicity of illustration and that the number of nodes and their configuration should not be a limitation on the present invention.

Referring to FIGS. 4A-4D, four basic cases are shown as to how the route for a connection between a source node A and destination node E can be adapted in accordance with step 210 of method 200. In the first case shown in FIG. 4A, node F listens at time $t_0$ to beacons 302 (not shown) sent by active nodes B and D (for example). And then at time $t_1$, node F inserts itself into the connection and excludes node C from the connection between the source node A and destination node E, provided an objective cost function is optimized in accordance with steps 206, 208 and 210 of method 200. It should be noted that in this case and the other examples described below where the reactive routing protocol adapts a resource in a distributed manner then one event preferably take place at a time so as to avoid concurrent adaptations.

Figure 4A:
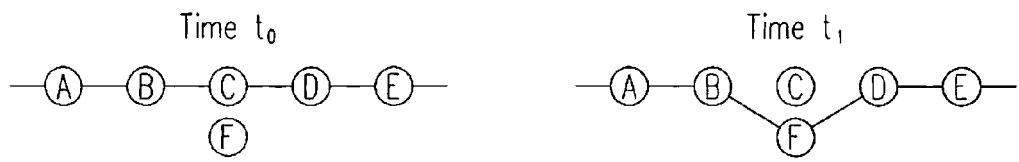
FIGS. 4A-4D are block diagrams illustrating different ways the reactive routing protocol can be used to adapt a route between a source node and a destination node in the multihop network of FIG. 1.
Figure 4B:
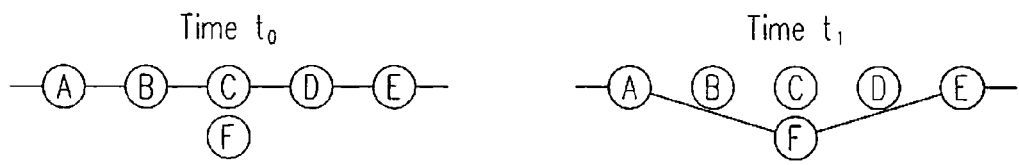

In the second case shown in FIG. 4B, node F listens at time $t_0$ to beacons 302 (not shown) sent by active nodes A, B, C, D and E (for example). And then at time $t_1$, node F inserts itself into the connection and excludes multiple nodes B, C and D from the connection between the source node A and destination node E, provided an objective cost function is optimized in accordance with steps 206, 208 and 210 of method 200.

Figure 4C:
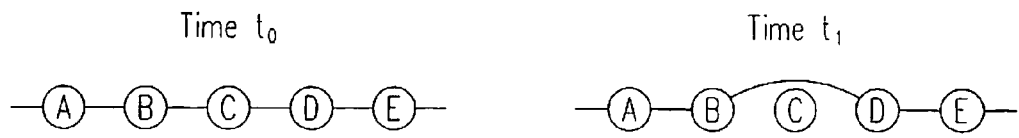

In the third case shown in FIG. 4C, active node C listens at time $t_0$ to beacons 302 (not shown) sent by active nodes B and D (for example). And then at time $t_1$, node C noticed that it offers a suboptimum path and initiates a path change where it excludes itself from the connection between the source node A and destination node E, provided an objective cost function is optimized in accordance with steps 206, 208 and 210 of method 200. As can be seen, the active node C in this case is capable of performing steps 204, 206, 208 and 210 in method 200.

Several ways exist on how these three cases can be implemented in accordance with method 200. In one example, a good choice is to exploit the accumulated cost (performance measure) that is distributed along a path and announced in a beacon 302. The cost along the path can then be compared with the cost determined by the node that overhears beacon(s) 302 and checks whether it should insert/exclude itself into/from the connection between source node A and destination node E.

In another example, transmit power (performance measure) can be used as a cost metric. For example, consider node j that estimates the cost for node j+1 based on the actual cost from node j−1. The costs incurred from node j−1 to j as well as from node j to j+1 are denoted with AC and relevant index. The total estimated cost at node j+1 is then:

$$\hat{C}_{j+1} = \Delta C_{j,j+1} + \Delta C_{j-1,j} + C_{j-1}$$

A new path is considered if the estimated cost is lower than the old existing cost as indicated below:

$$\text{New path} = \begin{cases} \text{Yes, if } \hat{C}_{j+1} < C_{j+1} \\ \text{No if } \hat{C}_{j+1} > C_{j+1} \end{cases}$$

The delta costs ΔC is related to the minimum power required to satisfy a SNR target $\Gamma_0$ (for the required rate in question). As an example for node j−1 to j, the minimum power P can be calculated as:

$$P_{j-1} = \frac{\Gamma_0 \cdot \sigma_j^2}{G_{j-1,j}}$$

where $G_{j-1,j}$ is the path gain from node j−1 to j and $\sigma_j^2$ is the receiver noise and interference power for node j. In addition to this, one may also ensure that any node (in this example, node j−1) is not allowed to transmit with power strong enough to lower the CIR of other existing connections below their respective target CIR, as indicated below:

$$\Delta C_{j-1,j} = \begin{cases} P, & \text{if } P < P_{max} \\ \infty, & \text{if } P > P_{max} \end{cases}$$

$P_{max}$ for a node can be determined for each timeslot (and thereby per connection) and distributed with the beacon 302. This procedure is preferably executed for each channel, allowing node j to determine also an optimal channel. In addition to the above power minimization criteria and CIR guarantee criteria, other criteria may be included. Examples of such criteria may include filtering of the cost (e.g. time averaging), hysteresis (to avoid ping-pong effects) and time related conditions.

It has been shown in FIGS. 4A-4B where only one node F inserts itself into a connection 406 between a source node A and a destination node E. However, a chain of nodes F and G could also be inserted into a connection between a source node A and a destination node E in an analogous manner, by offering a path that minimized the cost function (see FIG. 4D). In particular, nodes F and G listen at time $t_o$ to beacons 302 (not shown) sent by active nodes A, B, C, D and E (for example). And then at time $t_1$, nodes F and G insert themselves into the connection and exclude multiple nodes C and D from the connection between the source node A and the destination node E, provided an objective cost function is optimized in accordance with steps 206, 208 and 210 of method 200.

Figure 4D:
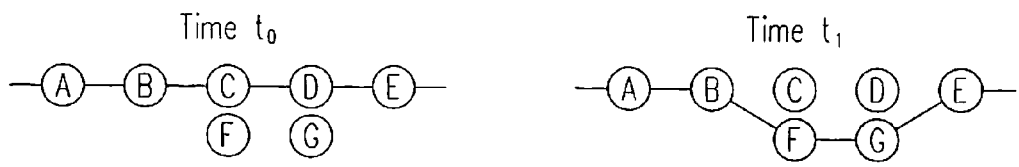

One way to enable nodes F and G to be inserted into a connection like the one shown in FIG. 4D is to build (reasonably long) shortest path trees outgoing form each node A, B, C, D and E along a connection. Shortest paths that pass through nodes F and G further downstream of the existing connection evaluate whether the cost offered by any shortest path trees is improved when compared to existing connection path. Similar to the first and second cases shown in FIGS. 4A and 4B, nodes F and G that are not part of the existing connection but are part of one or more shortest path trees rooted at one or more nodes along the connection may actively insert themselves, provided that a improved path is found. To limit the complexity of this embodiment, a limited number of hops may be allowed for the shortest path trees.

To implement the case shown in FIG. 4D, the objective cost function may also incorporate an additional cost factor $C_{extr}$ that ensures any adaptation by step 210 strives towards using the shortest path to connect the source node A and destination node E. This extra cost factor can be determined in following manner wherein every node generates a shortest path tree (performance measure) through slow proactive routing using a Bellman Ford algorithm (for example). Each node i then has a cost from itself to every other node j. The cost is denoted Cij. Node i can then determine the extra cost depending on its cost to any two nodes S and D (not shown) as indicated below:

$$C_{extra} = f(C_{iS}, C_{iD})$$

where the function can be an addition or multiplication. This ensures that the extra cost increases as it gets further away from the source node and destination node. This cost is then also included with the basic cost determination in step 208 through a simple addition or other operation.

Referring back to the adaptation step 210 in method 200, it should be appreciated that the reactive routing protocol can enable the resources of the multihop network 100 and 400 to be adapted in a "distributed manner" in response to topology changes within the multihop network 100 and 400 to optimize the performance of a connection between a source node and a destination node. For a well behaved distributed operation, i.e. avoiding time races between control signals potentially resulting in in-efficient optimizations (or potential deadlocks), special scheduling may be needed for the control signaling. The scheduling is arranged in such way that only one event in a local region preferably, i.e. resource optimization take place at a time. This characteristic, we denote as locally atomic. To ensure that the multihop networks 100 and 400 are locally atomic for control traffic, wherein only one event takes place at a time, the multihop networks 100 and 400 can use any distributed multiple access protocol having the required characteristic, such as the one described in an article by R. Rozovsky et al. "SEEDEX: A MAC protocol for ad hoc networks" Mobilhoc 2001 proceedings, the contents of which are incorporated herein. The multiple access protocols may in addition to being used when reallocating resources can also be used in assigning the transmit times of the beacons 302.

From the foregoing, it can be readily appreciated by those skilled in the art that the present invention provides a multihop network, node and reactive routing protocol which helps to optimize the performance or quality of a connection between a source node and a destination node. As disclosed, the present invention operates to continuously adapt the multihop network's resources in response to the multihop network's topology changes to optimize the performances of connections between source and destination nodes. When adapting the connection, the route, channel and Physical (e.g. power) layer parameters can be jointly and continuously adapted in response to topology changes. In another embodiment, the resource adaptation could take place on a timescale that is fast enough to follow instantaneous channel fluctuations, such as those incurred by channel fading and traffic fluctuations, and hence this type of resource adaptation would be of an opportunistic character where peak of channel opportunities are exploited.

Following are some additional features, advantages and uses of the multihop network, node and reactive routing protocol of the present invention:

The multihop network can be associated with ad hoc networks where nodes are mostly mobile and no central coordinating infrastructure exists. The nodes in such a network can be a laptop computer, mobile phone and/or a personal digital assistant (PDA). However, the multihop network can be applied when nodes are fixed. One such scenario targets rural area Internet access and uses fixed nodes attached to the top of house roofs, lamp posts and so forth.

One advantage of the present invention is that when the channel fluctuations occur with a coherence time on the order of or greater than the resource assignment response time, then channel assignment within the multihop network will be opportunistic.

Another advantage of the present invention is that multiple layer functions are jointly and continuously optimized which promises improved performance in the multihop network.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A multihop network, comprising:
   a source node;
   a neighboring node;
   an active node; and
   a destination node;
   wherein the neighboring node is within reach of the source node, the active node and the destination node;
   wherein the multihop network has a topology;
   wherein the active node is located in a connection between the source node and the destination node and is capable of receiving from another active node and transmitting to the neighboring node a beacon containing a measure of performance for the connection between the source node and the destination node, wherein the measure of performance contained in the beacon is related to a change of the topology of the multihop network, and wherein the change of the topology includes one or more of the following:
   quality variations in a channel between the source node and the destination node, which quality variations comprises channel fading;
   changes in transmit patterns of data traffic in the multihop network; or changes in allocations of a network resource in the multihop network;
wherein nodes implement a reactive routing protocol where the network resource of the multihop network is adapted in a distributed manner by the neighboring node or the active node in response to the change of the topology in the multihop network to optimize performance of the connection between the source node and the destination node;
wherein the change of the topology is determined to have occurred based on the measure of performance contained in the beacon;
wherein the distributed manner provides one resource adaptation at a time;
wherein the network resource includes one or more of the following:
the channel; or
physical layer parameters; and
wherein the connection between the source node and the destination node is defined through the channel.

2. The multihop network of claim 1, wherein the multihop network is a wireless multi hop network, and wherein the data traffic is transmitted between the source node and the destination node.

3. The multihop network of claim 1, wherein one of the neighboring node or the active node adapts the network resource in an opportunistic manner in response to an instantaneous topology change in the multihop network.

4. The multihop network of claim 1, wherein one of the neighboring node or the active node adapts the network resource in the distributed manner where the neighboring node is inserted into the connection between the source node and the destination node, and wherein the active node is removed from the connection between the source node and the destination node.

5. The multihop network of claim 1, wherein one of the neighboring node or the active node adapts the network resource in the distributed manner where the active node is removed from the connection between the source node and the destination node.

6. The multihop network of claim 2, wherein the active node transmits the beacon containing the measure of performance for the connection between the source node and the destination node;
wherein the neighboring node is associated with the connection between the source node and the destination node, wherein the neighboring node performs the following steps:
receiving the beacon;
calculating a cost function based on the measure of performance in the beacon; and
adapting the network resource in the wireless multihop network if it is possible to improve the cost function with regards to signal to noise ratio, power, carrier to interference ratio, for the connection between the source node and the destination node.

7. The multihop network of claim 6, wherein the beacon includes a general broadcast part and a connection related part that contains the measure of performance which includes:
an accumulated cost for the connection between the source node and the destination node; or
a maximum allowed power for transmitting by the active node.

8. A method for optimizing performance of a connection between a source node and a destination node in a multihop network, the multihop network comprising the source node, a neighboring node, an active node, and the destination node, wherein the neighboring node is within reach of the source node, the active node and the destination node; wherein the multihop network has a topology; wherein the active node is located in the connection between the source node and the destination node; the method comprising:
receiving, at the active node, from another active node and transmitting, to the neighboring node, a beacon containing a measure of performance for the connection between the source node and the destination node; which the measure of performance contained in the beacon is related to a change of the topology of the multihop network; wherein the change of the topology includes one or more of the following:
quality variations in a channel between the source node and the destination node, which quality variations comprises channel fading;
changes in transmit patterns of data traffic in the multihop network; or
changes in allocations of a network resource in the multihop network;
determining, at the active node or the neighboring node, the change of the topology based on the measure of performance contained in the beacon;
nodes implementing a reactive routing protocol;
adapting in a distributed manner by the neighboring node or the active node the network resource of the multihop network in response to the change of the topology in the multihop network to optimize the performance of the connection between the source node and the destination node, wherein the distributed manner provides one resource adaptation at a time;
wherein the network resource includes one or more of the following:
the channel; or
physical layer parameters; and
wherein the connection between the source node and the destination node is defined through the channel.

9. The method of claim 8, wherein the multihop network is a wireless multihop network, and wherein the method further comprises transmitting the data traffic between the source node and the destination node.

10. The method of claim 8, wherein one of the neighboring node or the active node adapts the network resource in an opportunistic manner in response to an instantaneous topology change in the multihop network.

11. The method of claim 8, wherein the adapting in the distributed manner by the neighboring node or the active node comprises:
inserting the neighboring node into the connection between the source node and the destination node; and
removing the active node from the connection between the source node and the destination node.

12. The method of claim 8, wherein the adapting in the distributed manner by the neighboring node or the active node further comprises removing the active node from the connection between the source node and the destination node.

13. The method of claim 9, wherein the active node transmits the beacon containing the measure of performance for the connection between the source node and the destination node;
wherein the neighboring node is associated with the connection between the source node and the destination node, wherein the neighboring node performs the following steps:
receiving the beacon;

calculating a cost function based on the measure of performance in the beacon; and adapting the network resource in the wireless multihop network if it is possible to improve the cost function with regards to signal to noise ratio, power, carrier to interference ratio, for the connection between the source node and the destination node.

14. The method of claim 13, wherein the beacon includes a general broadcast part and a connection related part that contains the measure of performance which includes:

an accumulated cost for the connection between the source node and the destination node; or a maximum allowed power for transmitting by the active node.

15. A node including a processor and memory for optimizing performance of a connection between a source node and a destination node in a multihop network, wherein the node is within reach of the source node and the destination node;

wherein the multihop network has a topology;

wherein the node is capable of receiving and transmitting a beacon containing a measure of performance for the connection between the source node and the destination node; which the measure of performance contained in the beacon is related to a change of the topology of the multihop network;

wherein the change of the topology includes one or more of the following:

quality variations in a channel between the source node and the destination node, which quality variations comprises channel fading;

changes in transmit patterns of data traffic in the multihop network; or changes in allocations of a network resource in the multihop network;

the node implementing a reactive routing protocol where the network resource of the multihop network is adapted in a distributed manner by the node in response to the change of the topology in the multihop network to optimize the performance of the connection between the source node and the destination node;

which change of the topology is determined to have occurred based on the measure of performance contained in the beacon;

which the distributed manner provides one resource adaptation at a time;

wherein the network resource includes one or more of the following:

the channel; or physical layer parameters; and wherein the connection between the source node and the destination node is defined through the channel.

16. The node according to claim 15, wherein the node is an active node or a neighboring node, which the active node is located in the connection between the source node and the destination node and which the neighboring node is within reach of the source node, the active node and the destination node.

* * * * *

UNITED STATES PATENT AND TRADEMARK OFFICE
CERTIFICATE OF CORRECTION

| | | |
|---|---|---|
| PATENT NO. | : 8,923,163 B2 | Page 1 of 1 |
| APPLICATION NO. | : 13/886923 | |
| DATED | : December 30, 2014 | |
| INVENTOR(S) | : Larsson et al. | |

It is certified that error appears in the above-identified patent and that said Letters Patent is hereby corrected as shown below:

In The Specification

In Column 4, Line 18, delete "where selected" and insert -- were selected --, therefor.

In Column 6, Line 18, delete "AC" and insert -- $\Delta C$ --, therefor.

Signed and Sealed this
Seventh Day of July, 2015

Michelle K. Lee
*Director of the United States Patent and Trademark Office*